US012532913B1

(12) United States Patent
Tarazi et al.

(10) Patent No.: US 12,532,913 B1
(45) Date of Patent: Jan. 27, 2026

(54) SMART HUMIDIFIER FOR HUMIDOR

(71) Applicants: Karim Tarazi, Simi Valley, CA (US); Nader Nabil Rayes, Camarillo, CA (US)

(72) Inventors: Karim Tarazi, Simi Valley, CA (US); Nader Nabil Rayes, Camarillo, CA (US)

( * ) Notice: Subject to any disclaimer, the term of this patent is extended or adjusted under 35 U.S.C. 154(b) by 0 days.

(21) Appl. No.: 19/278,640

(22) Filed: Jul. 23, 2025

(51) Int. Cl.

| | |
|---|---|
| ***A24F 25/00*** | (2006.01) |
| ***B01F 23/21*** | (2022.01) |
| ***B01F 23/213*** | (2022.01) |
| ***B01F 35/21*** | (2022.01) |
| ***B01F 35/213*** | (2022.01) |
| ***B01F 35/22*** | (2022.01) |
| ***B05B 17/06*** | (2006.01) |
| ***B65D 81/22*** | (2006.01) |

(52) U.S. Cl.
CPC .......... *A24F 25/00* (2013.01); *B01F 23/2133* (2022.01); *B01F 35/213* (2022.01); *B01F 35/2135* (2022.01); *B01F 35/2205* (2022.01); *B05B 17/0684* (2013.01); *B65D 81/22* (2013.01)

(58) Field of Classification Search
None
See application file for complete search history.

(56) References Cited

U.S. PATENT DOCUMENTS 1,639,912 A * 8/1927 Ward ...................... A24F 25/02 239/44
1,676,943 A * 7/1928 Dargavel ................ A24F 25/02 239/49
5,803,247 A * 9/1998 Holmes .................. A24F 25/02 206/256
5,829,452 A * 11/1998 Oster ..................... A24F 25/02 131/250
5,829,581 A * 11/1998 Wicker .................. A24F 25/02 206/256

(Continued)

FOREIGN PATENT DOCUMENTS

CN 207729767 U * 8/2018 ................ F24F 6/12
CN 109393849 A 3/2019

(Continued)

OTHER PUBLICATIONS

Cigar Oasis, "Oasis Excel Manual", Apr. 2014, CigarOasis.com. (Year: 2014).*

(Continued)

*Primary Examiner* — Mohammad Ali
*Assistant Examiner* — Kelvin Booker
(74) *Attorney, Agent, or Firm* — Knobbe, Martens, Olson & Bear LLP

(57) ABSTRACT

A smart humidifier (e.g., for humidors, such as cigar humidors) has a built in refillable water tank, a wick disposed in the tank in fluid communication with liquid in the tank, and an automizer operable to convert liquid in the wick to a mist that is dispersed out of a housing of the humidifier. The humidifier includes a sensor that senses relative humidity of a space adjacent the humidifier, and a microcontroller unit controls an operation of the atomizer to adjust the humidity in the space to maintain the humidity within a preferred humidity range.

20 Claims, 8 Drawing Sheets

(56) References Cited

U.S. PATENT DOCUMENTS

| | | | | | |
|---|---|---|---|---|---|
| 5,832,934 | A * | 11/1998 | Schmidt | A24F 13/24 | 206/270 |
| 5,957,554 | A * | 9/1999 | Pendergast | A24F 25/02 | 261/99 |
| 5,975,288 | A * | 11/1999 | Crowder | A24F 25/02 | 206/242 |
| 6,027,187 | A * | 2/2000 | Siepmann | A24F 25/02 | 206/242 |
| 6,068,113 | A * | 5/2000 | Schmaling | A45C 13/103 | 312/31.1 |
| 6,094,917 | A * | 8/2000 | Sundhar | F25B 21/02 | 62/3.4 |
| 6,112,889 | A * | 9/2000 | Wicker | A24F 25/02 | 206/256 |
| 6,122,918 | A | 9/2000 | Johnson, Jr. | | |
| 6,157,306 | A | 12/2000 | Mularoni | | |
| 6,279,581 | B1 * | 8/2001 | Knepper | A24F 15/18 | 206/256 |
| 6,298,857 | B1 * | 10/2001 | Schmidt | A24F 13/24 | 131/303 |
| D585,534 | S * | 1/2009 | Chen | D23/356 | |
| 8,178,854 | B1 * | 5/2012 | Elliott | A24F 25/02 | 312/231 |
| D756,032 | S | 5/2016 | Chen | | |
| 10,121,460 | B1 * | 11/2018 | Hepple | G10D 3/02 | |
| 10,440,988 | B2 | 10/2019 | Alvez et al. | | |
| 10,634,428 | B1 | 4/2020 | Peter | | |
| 10,806,177 | B2 | 10/2020 | Birchler et al. | | |
| 11,371,732 | B1 | 6/2022 | Rodrigues et al. | | |
| 11,732,911 | B2 | 8/2023 | Ou | | |
| 11,812,781 | B1 | 11/2023 | Siann et al. | | |
| 11,812,782 | B1 | 11/2023 | Bonini, III | | |
| D1,036,003 | S * | 7/2024 | Sharp | D27/189 | |
| 12,025,341 | B2 | 7/2024 | Ludek et al. | | |
| 12,085,292 | B2 | 9/2024 | Goudy et al. | | |
| 2003/0136705 | A1 * | 7/2003 | Roth | A24C 1/00 | 206/582 |
| 2007/0000502 | A1 * | 1/2007 | Chong | A24F 15/18 | 131/249 |
| 2007/0012796 | A1 | 1/2007 | Pohl | | |
| 2008/0047702 | A1 * | 2/2008 | Neff | B65D 81/266 | 165/222 |
| 2011/0126704 | A1 * | 6/2011 | Neff | A24F 25/02 | 95/10 |
| 2013/0220845 | A1 * | 8/2013 | Smith | A24F 25/02 | 206/213.1 |
| 2015/0013693 | A1 * | 1/2015 | Fuisz | A24C 5/60 | 131/290 |
| 2015/0021217 | A1 * | 1/2015 | Smith | A24F 25/02 | 206/236 |
| 2015/0122274 | A1 * | 5/2015 | Cohen | A24F 40/40 | 131/328 |
| 2018/0192696 | A1 * | 7/2018 | Narducci | A24F 15/18 | |
| 2018/0206557 | A1 * | 7/2018 | Peleg | A24F 40/10 | |
| 2019/0045842 | A1 * | 2/2019 | Alvez | F24F 6/12 | |
| 2019/0320724 | A1 * | 10/2019 | Peleg | A24F 40/50 | |
| 2022/0218021 | A1 * | 7/2022 | Peleg | A24F 40/50 | |
| 2024/0068680 | A1 | 2/2024 | Wei et al. | | |
| 2024/0099368 | A1 * | 3/2024 | Peleg | A24F 40/50 | |
| 2024/0200807 | A1 | 6/2024 | Choi et al. | | |
| 2024/0353127 | A1 | 10/2024 | Wei et al. | | |
| 2024/0361018 | A1 | 10/2024 | Kim et al. | | |
| 2024/0361030 | A1 | 10/2024 | Jeong et al. | | |
| 2025/0033864 | A1 * | 1/2025 | Mansour | B65D 43/0202 | |
| 2025/0089764 | A1 * | 3/2025 | Crawford | B65D 81/22 | |

FOREIGN PATENT DOCUMENTS

| | | | | |
|---|---|---|---|---|
| CN | 208805742 | U | 4/2019 | |
| CN | 209588265 | U * | 11/2019 | F24F 6/00 |
| CN | 210018682 | U | 2/2020 | |
| CN | 211747625 | U * | 10/2020 | B65D 85/12 |
| CN | 212590240 | U | 2/2021 | |
| CN | 215685907 | U | 2/2022 | |
| CN | 217686130 | U | 10/2022 | |
| CN | 117243411 | A | 12/2023 | |
| CN | 220369481 | U | 1/2024 | |
| CN | 222560183 | U * | 3/2025 | F24F 6/12 |
| KR | 102668398 | B1 | 5/2024 | |

OTHER PUBLICATIONS

Cigar Oasis, "Oasis Ultra 2.0 Manual", Apr. 2014, CigarOasis.com. (Year: 2014).*

* cited by examiner

SMART HUMIDIFIER FOR HUMIDOR

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present disclosure is directed to a humidifier, and more particularly to a smart humidifier which can be used in a humidor.

Description of the Related Art

Products such as cigars benefit from humidity control, which can improve the cigar's flavor, burn, and the user's smoking experience. However improper humidity control can result in dry or bitter cigars or cigars that do not burn evenly. Further, improper humidity control can result in mold.

SUMMARY

Accordingly, there is a need for an improved humidifier for use, for example, in humidors (e.g., cigar humidors) that can continuously monitor and control humidity in an enclosure.

In some aspects, the techniques described herein relate to a smart humidifier, including: a housing; a refillable tank configured to be filled with a liquid via an opening and disposed in the housing; a wick disposed in a chamber in the tank and in fluid communication with liquid in the tank; an atomizer disposed in the housing between an aperture and an end of the wick, the atomizer being actuatable to vibrate against the end of the wick to convert the liquid in the wick to a mist; a sensor operable to sense a relative humidity of a space adjacent the housing; a battery; an electronic display; a user interface electrically connected to the electronic display; and a microcontroller unit electrically connected to the atomizer, the battery the sensor, the electronic display and the user interface, the microcontroller configured to operate the atomizer based on the sensed relative humidity to adjust the relative humidity, the microcontroller configured to: operate in a standby state with the atomizer in an unpowered state when the sensed humidity is within a preferred humidity range, collect telemetry data including humidity, temperature and tank water level data following a wake up event, determine whether the atomizer is idle and ready for operation, determine whether the sensed humidity is within a preferred range following a determination that the atomizer is idle and ready, operate in a humidifying state with the atomizer actuated for a period of time when the sensed humidity is outside the preferred humidity range to increase a humidity in the space, and return to the standby state.

In some aspects, the techniques described herein relate to a smart humidifier, including: a housing; a refillable tank configured to be filled with a liquid and disposed in the housing; a wick disposed in a chamber in the tank and in fluid communication with liquid in the tank; an atomizer disposed in the housing between an aperture and an end of the wick, the atomizer being actuatable to vibrate against the end of the wick to convert the liquid in the wick to a mist; a sensor operable to sense a relative humidity of a space adjacent the housing; a battery; and a microcontroller unit electrically connected to the atomizer, the battery the sensor, the microcontroller configured to operate the atomizer based on the sensed relative humidity to adjust the relative humidity, the microcontroller configured to: operate in a standby state with the atomizer in an unpowered state when the sensed humidity is within a preferred humidity range, collect telemetry data including humidity, temperature and tank water level data following a wake up event, determine whether the atomizer is idle and ready for operation, determine whether the sensed humidity is within a preferred range following a determination that the atomizer is idle and ready, operate in a humidifying state with the atomizer actuated for a period of time when the sensed humidity is outside the preferred humidity range to increase a humidity in the space, and return to the standby state.

In some aspects, the techniques described herein relate to a smart humidifier, including: a housing; a refillable tank configured to be filled with a liquid and disposed in the housing; a wick disposed in a chamber in the tank and in fluid communication with liquid in the tank; an atomizer disposed in the housing between an aperture and an end of the wick, the atomizer being actuatable to vibrate against the end of the wick to convert the liquid in the wick to a mist; a sensor operable to sense a relative humidity of a space adjacent the housing; a battery; and a microcontroller unit electrically connected to the atomizer, the battery the sensor, the microcontroller configured to operate the atomizer based on the sensed relative humidity to adjust the relative humidity, the microcontroller configured to: operate in a standby state with the atomizer in an unpowered state when the sensed humidity is within a preferred humidity range, determine whether the atomizer is idle and ready for operation, determine whether a sensed humidity is within a preferred range following a determination that the atomizer is idle and ready, operate in a humidifying state with the atomizer actuated for a period of time when the sensed humidity is outside the preferred humidity range to increase a humidity in the space, and return to the standby state.

DETAILED DESCRIPTION

Figure 1:
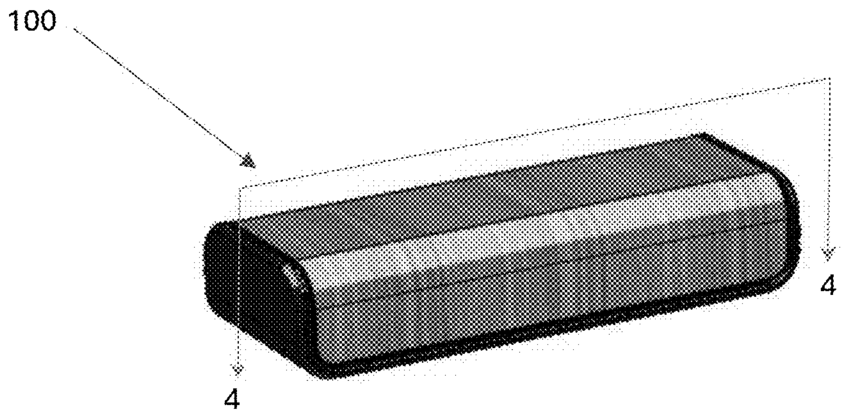
FIG. 1 is a schematic perspective view of a smart humidifier.
Figure 2:
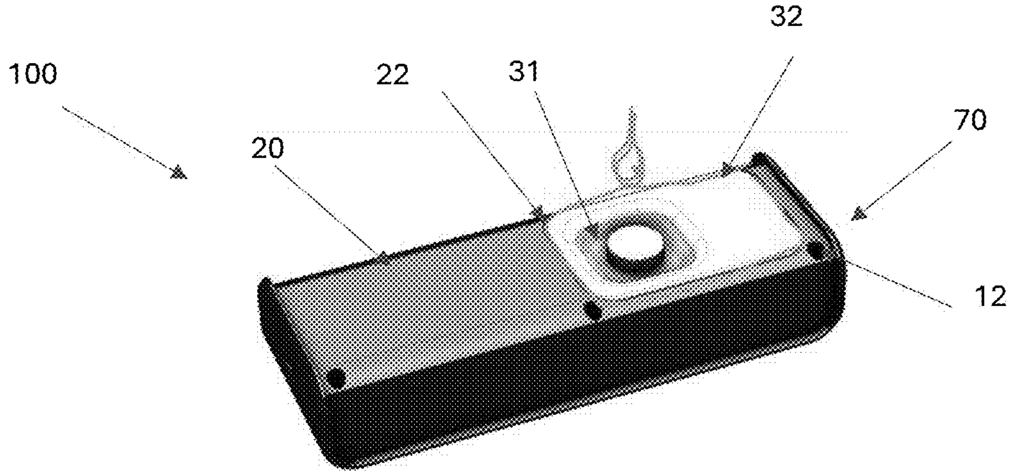
FIG. 2 is a schematic perspective view of the smart humidifier of FIG. 1 with the cover removed.
Figure 3:
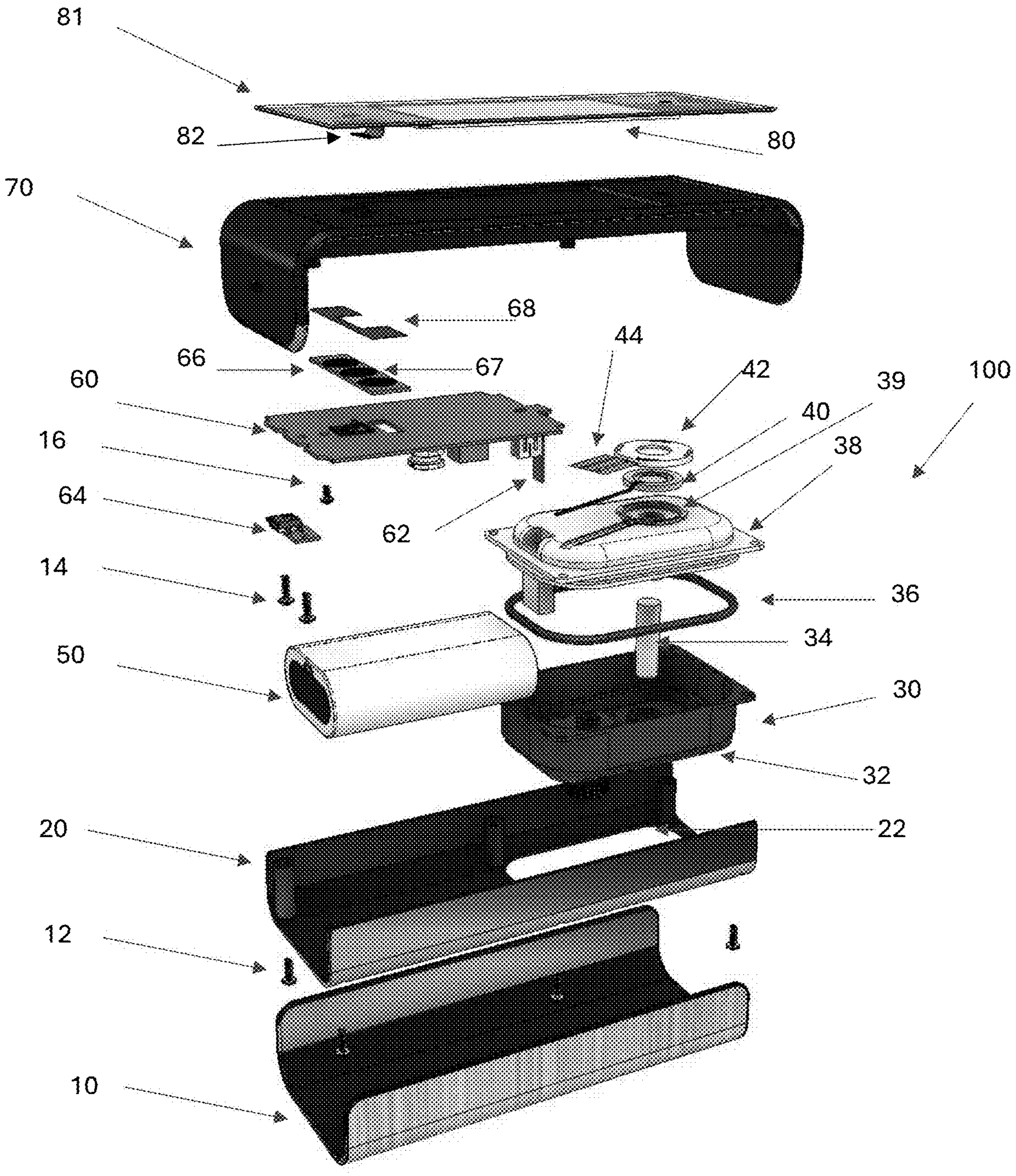
FIG. 3 is a schematic exploded view of the smart humidifier of FIG. 1.

FIGS. 1-5 show a smart humidifier 100 for controlling humidity in an enclosure. In one example, the humidifier 100 can be portable and cordless (e.g., it does not require a cable connection to an external power source to operate). With reference to FIG. 3, the humidifier 100 includes an outer cover 10, a chassis 20 with an opening 22, a reservoir base 30 with a reservoir cap 32, a wick 34, an O-ring 36, a reservoir cover 38 with a recessed opening 39, an atomizer 40, an atomizer cap 42, tape 44, a battery pack 50, a main printed circuit board 60, a level sensing printed circuit board 62, a UCB-C printed circuit board (PCB) 64, a capacitive touch sensor printed circuit board 66, a capacitive touch sensor 68 (e.g., capacitive touch pressure-sensitive adhesion (PSA)), a housing 70, and an electronic display 80 with an electrical connector 82. The humidifier 100 includes fasteners 12 (e.g., screws) for fastening the chassis 20 and housing 10, fasteners 14 (e.g., screws) for fastening the USB-C PCB 64 to the housing 70, and fasteners 16 (e.g., screws) for fastening the main circuit board 60 to the housing 70.

Figure 4:
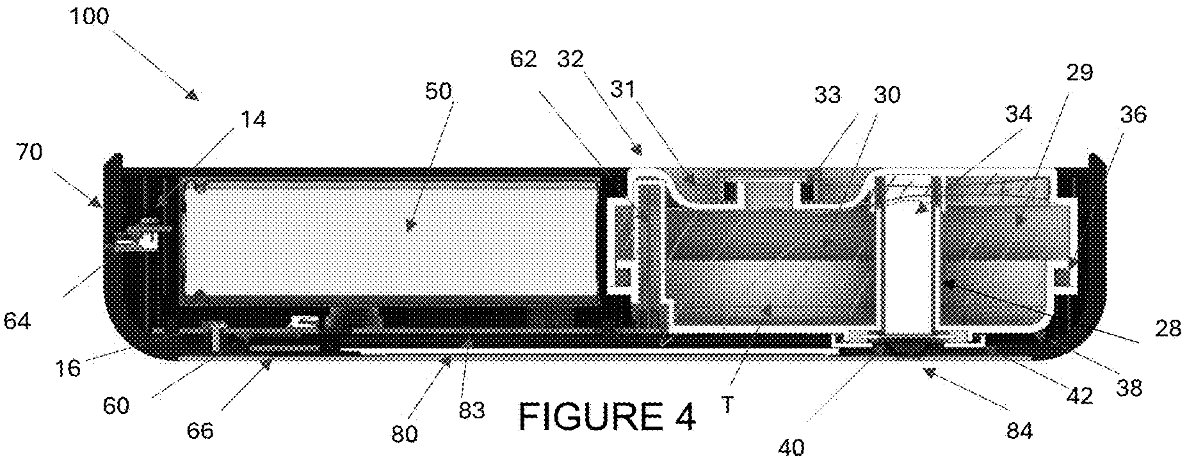
FIG. 4 is a schematic cross-sectional view of the smart humidifier of FIG. 1 along line 4-4.
Figure 5:
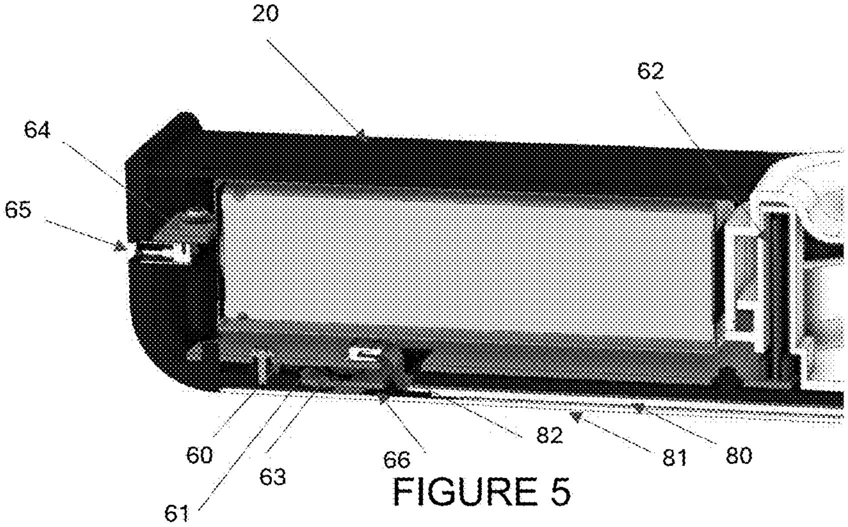
FIG. 5 is a schematic partial cross-sectional view.

FIGS. 4-5 show cross-sectional views of the smart humidifier 100. The reservoir base 30 and reservoir cover 38 define a tank T reservoir or chamber 29 therebetween that can be filled with a liquid (e.g., water). In one example, the two parts (reservoir base 30 and reservoir cover 38) are attached (e.g., coupled via threads, clamped together), with the O-ring 36 between the two parts to inhibit (e.g., prevent) leakage of water via the junction between the reservoir base 30 and the reservoir cover 38. In another example, as further discussed below, the reservoir base 30 and the reservoir cover 38 (the two parts that construct the reservoir) can be ultrasonically welded together, advantageously ensuring water tightness between the two parts. The chamber 29 (provides a built in tank in the humidifier 100 and) can be filled with liquid (e.g., water) via a recess 31 in the reservoir cap 32 and annular channel 33. In the illustrated example, an O-ring (not shown) is placed (e.g., in the recess 31) in the reservoir cap 32 between the filler cap and the reservoir base 30 to advantageously provide a watertight assembly and inhibit (e.g., prevent) spilling of water from the tank. An annular gasket (not shown) surrounds the atomizer 40, which will be compressed between the reservoir top and a plastic cover 42. In one example, the reservoir or chamber 29 can hold between about 50 mL and 100 mL of liquid (e.g., water). The reservoir or chamber 29 is advantageously completely sealed to inhibit (e.g. prevent) spilling of the liquid (e.g., water), which advantageously allows for a more accurate control of the amount of water into the chamber.

As shown in FIG. 2, when the outer cover 10 is removed from the chassis 20, liquid can be poured into the recess 31 in the reservoir cap 32. Said liquid passes through the annular channel 33 into the chamber 29. The wick 34 extends within a channel 28 into the chamber 29 and can be wetted by the liquid, which can flow through openings (e.g., slits) in the channel 28 so that the wick 34 is wetted along its length while in the channel 28. In one example, the wick 34 can be spaced from the wall of the channel 28 so that water can flow between the wick 34 and the wall of the channel 28. The wick can be constantly wetted by the liquid in the tank, and absorbs and retains liquid.

In one example, the wick 34 is disposed between and adjacent the atomizer 40 and an inner surface of the reservoir cap 32. In one example, the wick 34 can be spring loaded relative to the reservoir cap 32. The atomizer 40 can be disposed in the recessed opening 39 and is (partially) covered by the atomizer cover 42. In one example, the atomizer 40 is a piezo atomizer that in operation vibrates or oscillates (e.g., at ultrasonic frequencies), and the vibration is transferred to the liquid in the wick 34 to break up the liquid into a fine mist of droplets (or water mist) that passes through microscopic holes (micropores) in the atomizer 40 (e.g., in the membrane of the atomizer 40) and that exit the humidifier 100 via an aperture 84 into an enclosure (e.g., a humidor), which provides the flow path out of the smart humidifier 100 for the water mist. The water mist exits via the aperture 84 as a plume of water mist into the enclosure (e.g., humidor) and propagates away from the humidor 100 into the enclosure to increase a humidity of the enclosure. When the atomizer 40 is not operated (e.g., not vibrating), water is inhibited (e.g., prevented) from passing through the atomizer 40 (e.g., through the micropores in the membrane of the atomizer 40). That is, the atomizer 40 (e.g., membrane of the atomizer 40) is semi-porous.

Liquid level in the reservoir or chamber 29 can be sensed by the liquid sensing printed circuit board 62, which in one example is attached to the main printed circuit board 60. In another example, the liquid sensing PCB 62 can be separate from the main PCB 60. The capacitive touch sensor PCB 66 can be connected to the main PCB 60 via one or more conductive links 63 therebetween. The USB-C PCB 64 can be electrically connected to the main PCB 60 and to a USB connector 65. The battery pack 50 provides power to the atomizer 40, sensors 83 and display 80, which is connected to the main PCB 60 via the electrical connector 82. A cover plate (e.g., plastic cover plate) 81 extends over the display 80 and capacitive touch sensor PCB 66. The battery pack 50 can, in one example, be rechargeable (e.g., via the USB-C connector 65). The battery pack 50 can in one example be a lithium ion (Li-on) battery pack (e.g., that provides 5000 mAh).

In one example, the display 80 (e.g., electronic display) can be an electrophoretic (e.g., e-paper) display. The capacitive touch sensors 68 on the capacitive touch sensor PCB 66 can be actuated via a user touching the cover plate 81 (e.g., plastic cover plate), thereby providing a user interface. The capacitive touch sensor PCB 66 can have one or more (e.g., three) capacitive touch buttons 67 (e.g., a "–" pad print on the left, a "+" pad print on the right and in the middle a pad print with 3 horizontal lines, also known as a hamburger menu icon).

Figure 6:
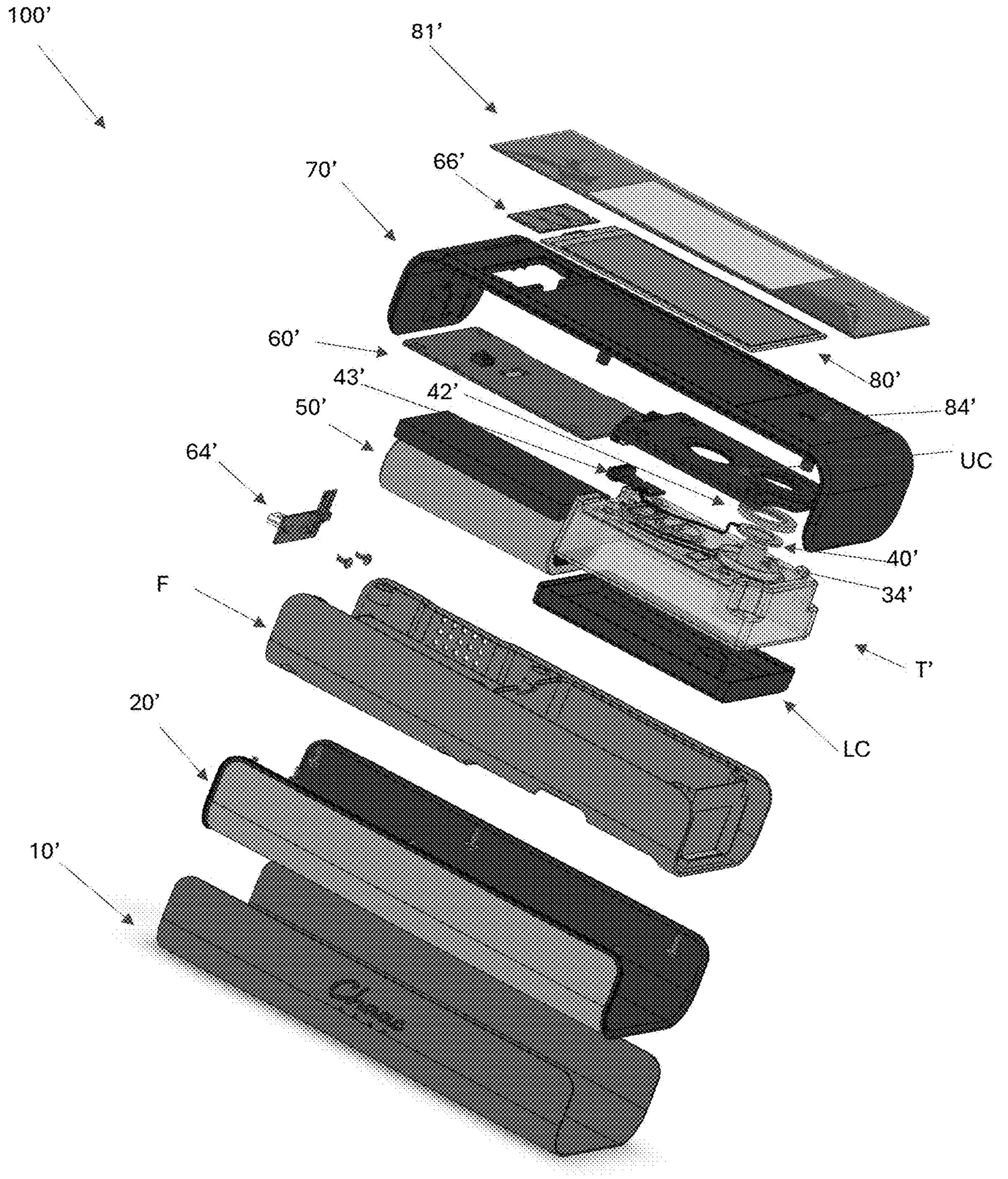
FIG. 6 is a schematic exploded view of a smart humidifier.
Figure 7:
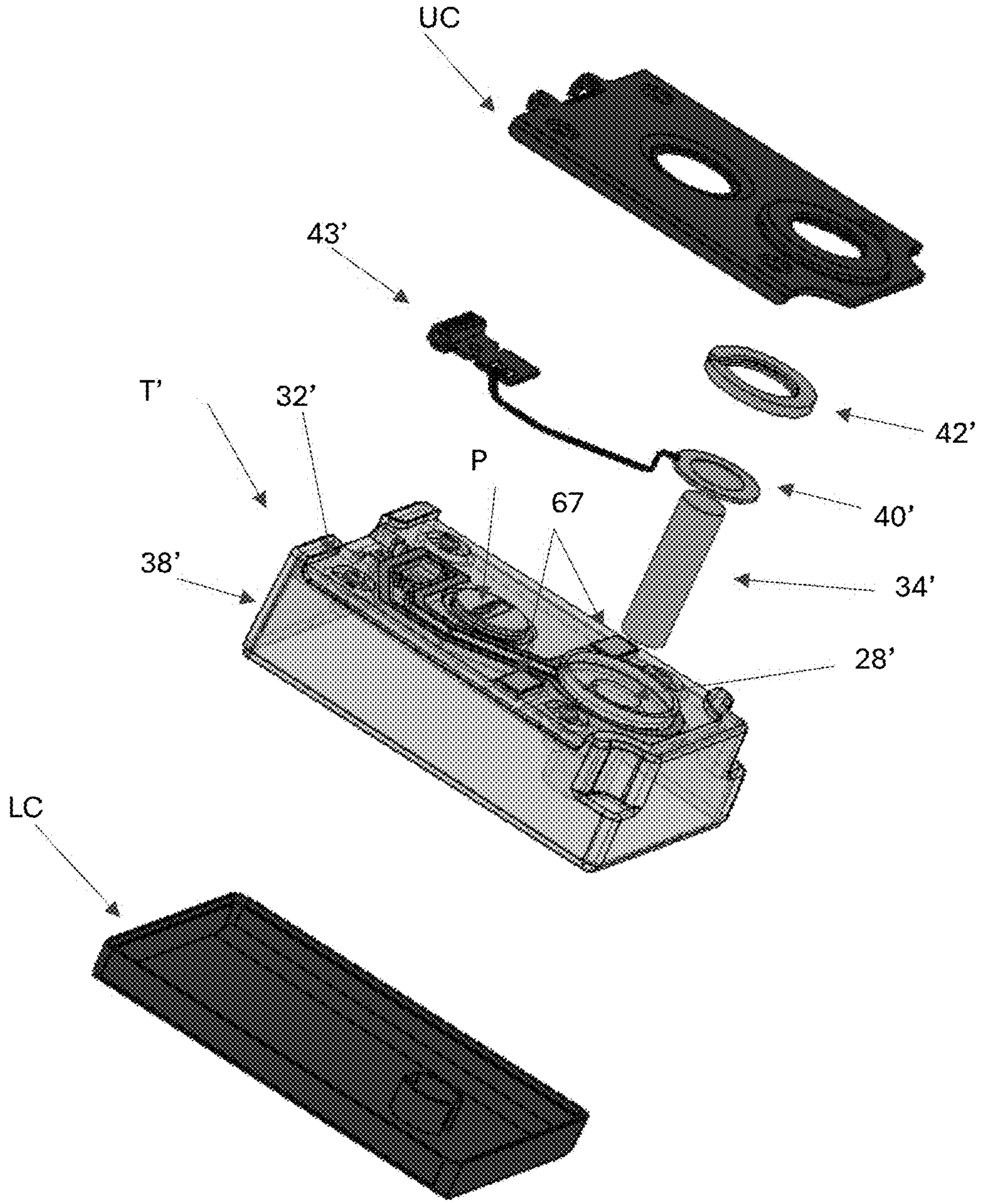
FIG. 7 is a schematic exploded view of a water tank and atomizer assembly of the mart humidifier of FIG. 6.
Figure 8:
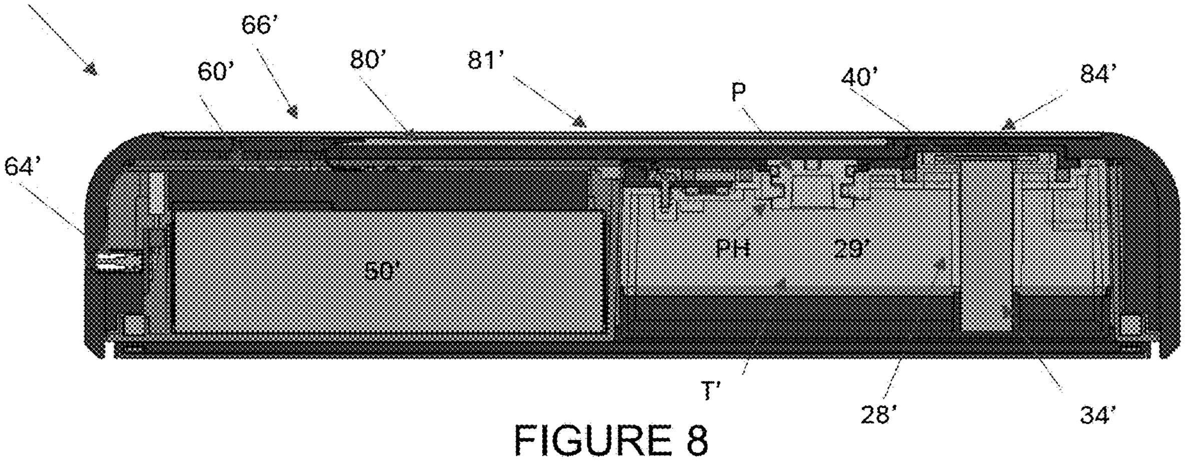
FIG. 8 is a schematic lengthwise cross-sectional view of the smart humidifier of FIG. 6.

FIGS. 6-8 show a humidifier 100'. The humidifier 100' is similar to the humidifier 100. Some of the features of the humidifier 100' are similar to the features of the humidifier 100 in FIGS. 1-5. Thus, reference numerals used to designate the various components of the humidifier 100' are identical to those used for identifying the corresponding components of the humidifier 100 in FIGS. 1-5, except that an "'" has been added to the end of the numerical identifier. Therefore, the structure and description for the various features of the humidifier 100 and how it's operated and controlled in FIGS. 1-5 are understood to also apply to the corresponding features of the humidifier 100' in FIGS. 6-8, except as described below.

The humidifier 100' differs from the humidifier 100 in that the reservoir cap 32' and reservoir cover 28' that define the water tank T' are ultrasonically welded together. In this implementation, an O-ring is excluded. Additionally, in one example, the tank T' is detachable or removable from a frame F that is disposed between the chassis 20' and the housing 70', so that the tank T' can be filled with water. The tank T' has a plug P that seals a porthole PH in the tank T'. The plug P can be removed from the porthole PH to allow filling of the tank T' with water, after which the plug P can be inserted into the porthole PH to seal the tank T' (e.g., to inhibit or prevent leakage of water from the tank T). The tank T can be disposed between an upper cover UC and a lower cover LC. The atomizer 40' can be connected to electronics 43' (e.g., via an electrical connection). The porthole and plug P can be on the same side of the tank T' as the atomizer 40', which advantageously removes any openings from a bottom side of the tank T' when the humidifier 100' is right side up (e.g., as shown in FIG. 8).

Figure 9:
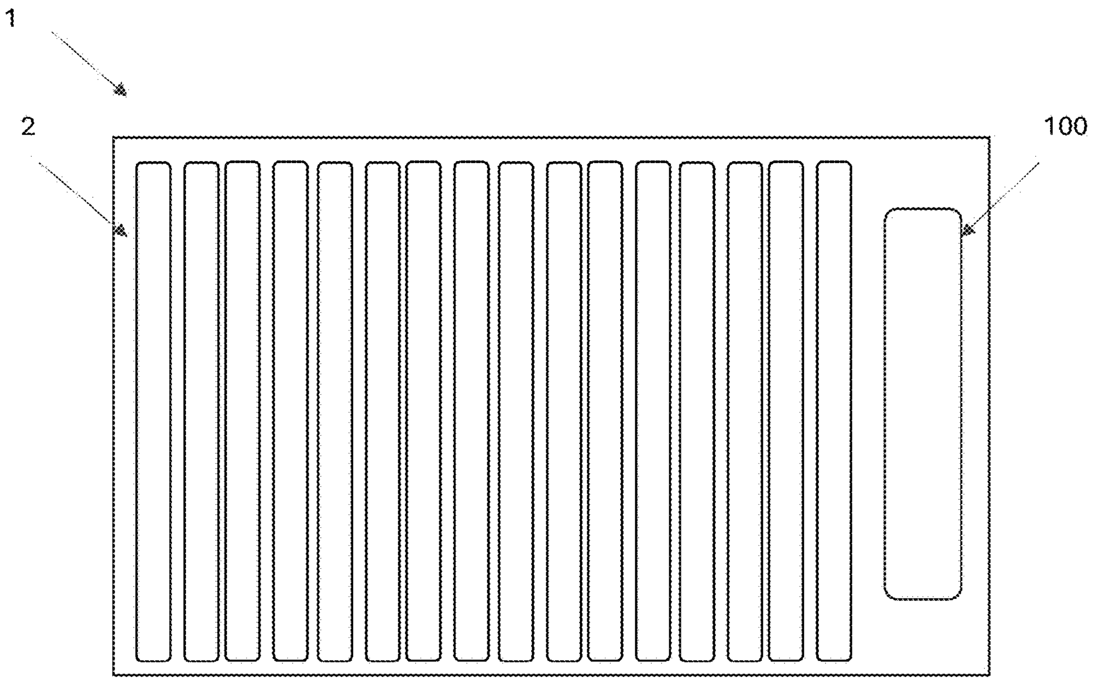
FIG. 9 is a schematic view of the smart humidifier in a humidor.

FIG. 9 shows one example of the smart humidifier 100, 100' disposed in an enclosure 1 (e.g., a humidor). The enclosure 1 can include one or more objects 2 to be humidified (e.g., cigars, cannabis, tobacco, cigarettes, etc.). The smart humidifier 100, 100' can be removably disposed in the enclosure 1 proximate or adjacent the one or more objects 2. In another example, the smart humidifier 100, 100' is built into the enclosure 1 (e.g., built into a humidor) and not readily removable. Though the smart humidifier 100, 100' is described in some examples herein for use with humidors, the smart humidifier 100, 100' is not limited for use with humidors and can be used in other implementations.

Figure 10:
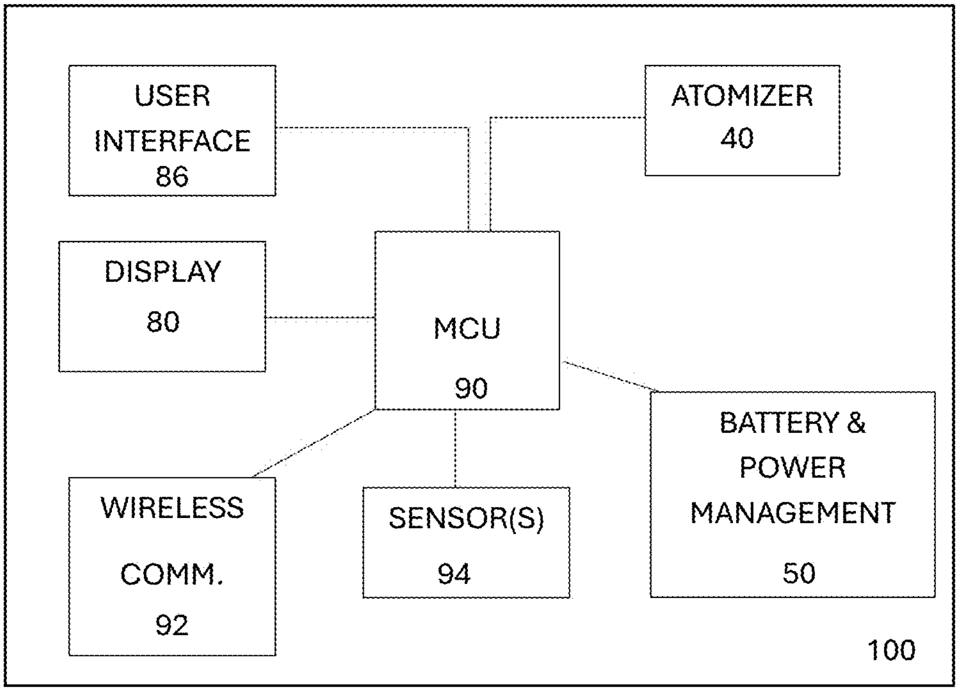
FIG. 10 is a diagram showing electronics of the smart humidifier.

FIG. 10 shows a diagram of electronics in the smart humidifier 100. The smart humidifier 100 can include a microcontroller unit (MCU) 90 with one or more computer processors that is electrically connected to a user interface 86, the display 80, the atomizer 40, the battery 50, one or more sensors 94 and wireless communication electronics 92. The one or more sensors 94 can include a temperature sensors, a humidity sensor (e.g., that senses relative humidity), a liquid level sensors, a touch sensor 61 that has an integrated circuit on the main PCB 60 (e.g., that facilitates waking up of system from lower power mode with a digital signal), a time of flight sensor 67 (see FIG. 7), or any combination of these. The time of flight sensor 67 can sit on the water tank (e.g., on the same level as the atomizer 40) and emits pulses of light into the tank that when reflects from the surface of water in the tank. The time of flight sensor 67 includes an emitter and light sensor that senses the light reflected from the surface of water in the tank to then calculate a distance and thereby water level in the tank. In one example, the humidity sensor can have an accuracy of 0.5% relative humidity (RH) and 0.1 degree Celsius.

The wireless communication electronics 92 can include Wi-Fi, short-range wireless communication (e.g., BLUETOOTH®), a radiofrequency antenna, or any combination of these. The wireless communication electronics 92 of the smart humidifier 100, 100' advantageously allow communication with a remote or cloud server, or remote electronic device (e.g., smartphone, smartwatch, tablet computer, laptop computer, desktop computer) to provide alerts to a user, for example on the humidity and/or temperature status of the enclosure in which the smart humidifier 100, 100' is held, to alert the user of an out-of-range event for temperature or humidity, low liquid level in the reservoir or chamber 39, low battery power level, etc. The wireless communication electronics 92 also allows a user to remotely control or adjust an operation of the smart humidifier 100, 100' (e.g., by changing preferred temperature and humidity setpoints). Advantageously, the smart humidifier 100, 100' can display the sensed temperature and/or humidity information to the user via the display 80 or on the remote electronic device (e.g., via an app on a smartphone), provide an alert (e.g., audible, visual), and transmit and receive commands and data to and from a cloud/backend server and/or remote electronic device. The audible alert can be provided via a buzzer or speaker mounted on, for example, the main PCB 60. The visual alert can be provided via the display 80 or communicated to the remote electronic device.

Figure 11:
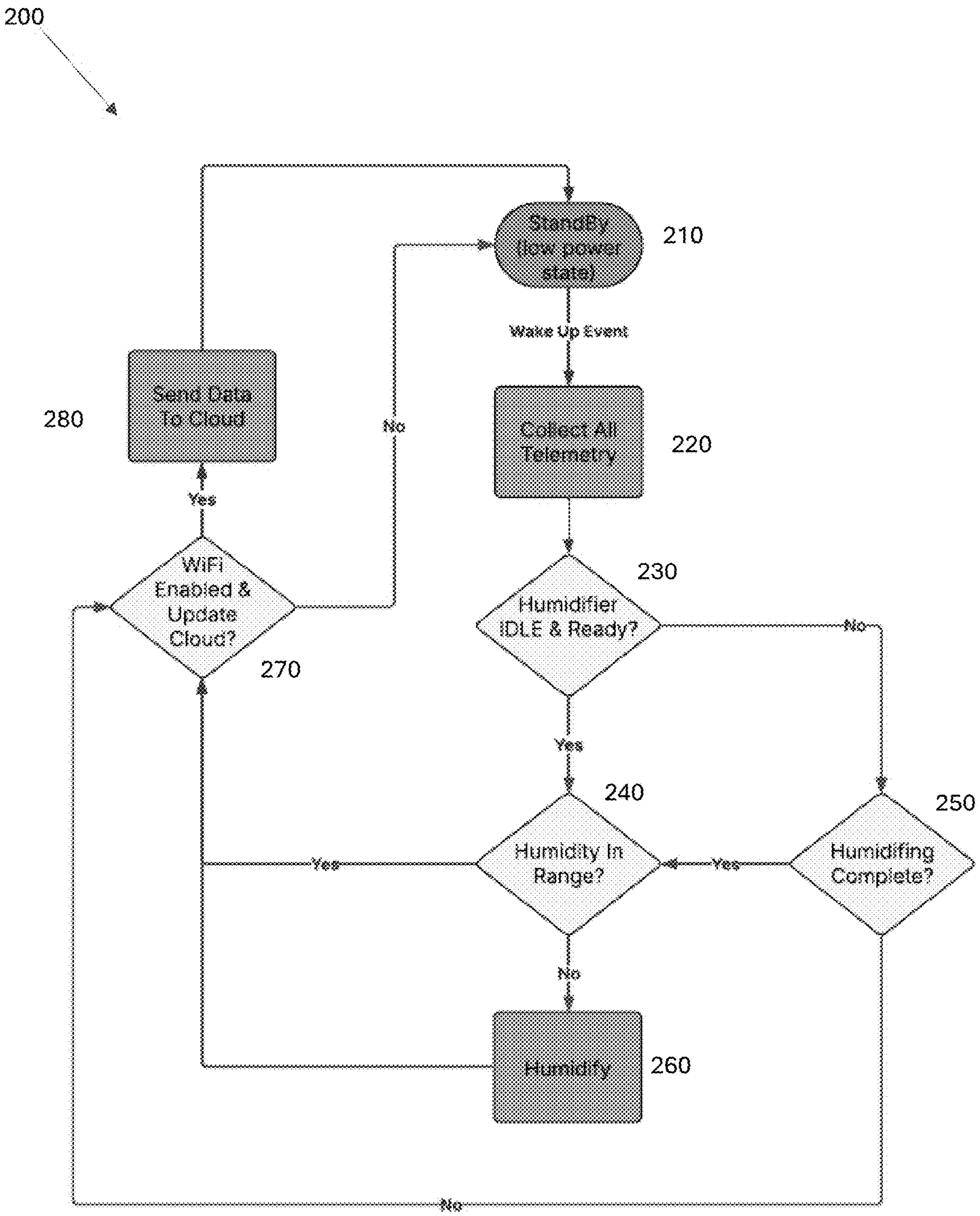
FIG. 11 is a flow diagram of a method of operation for the smart humidifier.

FIG. 11 shows a method 200 of operation of the smart humidifier 100, 100'. Advantageously, the smart humidifier 100, 100' can be operated to sense, adjust and/or control the humidity in an enclosure (e.g., a case, a humidor). Optionally, temperature can also be sensed. In one example, an alert (e.g., visual, audible, via the remote electronic device) is provided to the user when the sensed temperature and/or sensed humidity is out of a target range.

The method 200 includes a standby or lower power state 210 in which the smart humidifier 100, 100' will spend most of the time. In the standby state 210, the system is asleep and consumes minimal power to maximize battery life and inhibit heat being generated by the electronics (e.g., allowing months of operation of the smart humidifier 100, 100' before needing to recharge the battery pack 50, 50'). When triggered by a wake up event (e.g., sensed temperature outside preferred range, sensed humidity outside preferred range, measured water level lower than predetermined amount, pressing of menu button, or the expiration of a periodic timer, for example set for 15 or 30 minutes), the smart humidifier 100, 100' will operate (e.g., via the electronics on the main PCB 60, 60') to collect telemetry (e.g., sense humidity, sense temperature, measure water level in the tank T, T'). In one example, the preferred (e.g., predetermined) humidity range is between about 68% and 72%, with a target of about 70%. In one example, the preferred (e.g., predetermined) temperature range is between about 16° C. and about 24° C., with a target of about 20° C.

Once the telemetry is collected (at step 220), the smart humidifier 100, 100' (e.g., via the electronics on the main PCB 60, 60') determines if the humidifier (e.g., the atomizer 40, 40') is idle and ready (at step 230). When the humidifier is idle, the atomizer 40, 40' is not operating. When the humidifier is ready, a period of time (e.g., at least a few minutes) has passed since the atomizer 40, 40' was operating, which allows the plume of water mist ejected from the aperture 84, 84' of the smart humidifier 100, 100' to have propagated into the enclosure (e.g., in which the smart humidifier 100, 100' is disposed or housed) to adjust a humidity in the enclosure. If the humidifier is determined to be idle and ready (at step 230), then the smart humidifier 100, 100' (e.g., via the electronics on the main PCB 60, 60') determines (at step 240) if the sensed humidity is within the desired (e.g., preferred, predetermined) range. If the sensed humidity is not within range, then the smart humidifier 100, 100' (e.g., via the electronics on the main PCB 60, 60') enters a humidifying state (at step 260) where the atomizer 40, 40' is operated (e.g., for a period of time).

Humidifying time will be calculation based. The system will look at the last previously determined humidity and the set atomization duration. If then looks at the current humidity and determines whether the last atomization duration was too much, too little or just right. If the change was too little or the delta with the target is larger than before, it will increase the atomization duration for the new event. If the previous duration caused an increase greater than the difference between the current and target humidity, then the system will reduce the atomization duration. If the humidity delta resulting from the last atomization event will bring the current humidity closer to target without going over, then the system will reuse the last atomization duration value. Advantageously, this approach allows for more accurate control and advantageously facilitates reaching the target humidity more quickly.

The smart humidifier 100, 100' (e.g., via the electronics on the main PCB 60, 60') can enable wireless communication (e.g., Wi-Fi) and determine whether to update the cloud (at step 270) and, if so, sends data to the cloud (at step 280), after which the smart humidifier 100, 100' (e.g., via the electronics on the main PCB 60, 60') returns to the standby state 210. In one implementation, data (e.g., updated temperature, updated, humidity, updated water level) is only sent to the cloud when sensed humidity was out of range (e.g., prior to the humidifying stage at step 260). If the smart humidifier 100, 100' (e.g., via the electronics on the main PCB 60, 60') determines that data does not need to be sent to the cloud (at step 270), the smart humidifier 100, 100' (e.g., via the electronics on the main PCB 60, 60') returns directly to the standby state 210.

If (at step 240) the sensed humidity is within (e.g., desired, preferred, predetermined) range, then the smart humidifier 100, 100' (e.g., via the electronics on the main PCB 60, 60') determine whether to update the cloud (at step 270) and, if so, sends data to the cloud (at step 280), after which the smart humidifier 100, 100' (e.g., via the electronics on the main PCB 60, 60') returns to the standby state 210. In one implementation, data (e.g., updated temperature, updated, humidity, updated water level) is only sent to the cloud when sensed humidity was out of range (e.g., prior to the humidifying stage at step 260). If the smart humidifier 100, 100' (e.g., via the electronics on the main PCB 60, 60') determines that data does not need to be sent to the cloud (at step 270), the smart humidifier 100, 100' (e.g., via the electronics on the main PCB 60, 60') returns directly to the standby state 210.

If, at step 230, the smart humidifier 100, 100' (e.g., via the electronics on the main PCB 60, 60') determines that the humidifier is not idle or not ready (at step 230), then the smart humidifier 100, 100' (e.g., via the electronics on the main PCB 60, 60') determines (at step 250) if the humidifying is complete (e.g., if the atomizer 40, 40' has stopped operating following a humidifying operation). If it determines that the humidifying (at step 250) is complete, the smart humidifier 100, 100' (e.g., via the electronics on the main PCB 60, 60') determines if the humidity is within (e.g., desired, preferred, predetermined) range (at step 240). If so, it moves onto step 270 to enable wireless communication (e.g., via Wi-Fi) and determine whether to update the cloud (e.g., with updated sensed humidity, temperature and tank water level data), and if so, upload the data to the cloud at step 280, as discussed above, before returning to the standby state 210. If the smart humidifier 100, 100' (e.g., via the electronics on the main PCB 60, 60') determines that data does not need to be sent to the cloud (at step 270), the smart humidifier 100, 100' (e.g., via the electronics on the main PCB 60, 60') returns directly to the standby state 210.

If at step 250 the smart humidifier 100, 100' (e.g., via the electronics on the main PCB 60, 60') determines that the humidifying step is not complete, then it moves onto step 270 to enable wireless communication (e.g., via Wi-Fi) and determine whether to update the cloud (e.g., with updated sensed humidity, temperature and tank water level data), and if so, upload the data to the cloud at step 280, as discussed above, before returning to the standby state 210. If the smart humidifier 100, 100' (e.g., via the electronics on the main PCB 60, 60') determines that data does not need to be sent to the cloud (at step 270), the smart humidifier 100, 100' (e.g., via the electronics on the main PCB 60, 60') returns directly to the standby state 210.

Additional Examples

In examples of the present disclosure, a smart humidifier may be in accordance with any of the following clauses:

Clause 1. A smart humidifier, comprising: a housing; a refillable tank configured to be filled with a liquid via an opening and disposed in the housing; a wick disposed in a chamber in the tank and in fluid communication with liquid in the tank; an atomizer disposed in the housing between an aperture and an end of the wick, the atomizer being actuatable to vibrate against the end of the wick to convert the liquid in the wick to a mist; a sensor operable to sense a relative humidity of a space adjacent the housing; a battery; an electronic display; a user interface electrically connected to the electronic display; and a microcontroller unit electrically connected to the atomizer, the battery the sensor, the electronic display and the user interface, the microcontroller configured to operate the atomizer based on the sensed relative humidity to adjust the relative humidity, the microcontroller configured to: operate in a standby state with the atomizer in an unpowered state when the sensed humidity is within a preferred humidity range, collect telemetry data comprising humidity, temperature and tank water level data following a wake up event, determine whether the atomizer is idle and ready for operation, determine whether the sensed humidity is within a preferred range following a determination that the atomizer is idle and ready, operate in a humidifying state with the atomizer actuated for a period of time when the sensed humidity is outside the preferred humidity range to increase a humidity in the space, and return to the standby state.

Clause 2. The smart humidifier of clause 1, wherein the microcontroller is configured to wirelessly communicate with a remote electronic device or server.

Clause 3. The smart humidifier of any preceding clause, further comprising a sensor operable to sense a temperature in the space.

Clause 4. The smart humidifier of any preceding clause, further comprising a sensor operable to sense a liquid level in the refillable tank.

Clause 5. The smart humidifier of any preceding clause, wherein the electronic display is an electrophoretic display.

Clause 6. The smart humidifier of any preceding clause, further comprising a buzzer or speaker electrically connected to the microcontroller unit and being operable to provide an audio alert when the sensed humidity is outside the preferred humidity range.

Clause 7. The smart humidifier of any preceding clause, wherein the atomizer and opening are on a same side of the tank.

Clause 8. The smart humidifier of any preceding clause, wherein following the humidifying state, the microcontroller is configured to enable wireless communication, determine whether to update a cloud based data storage, and to optionally send the telemetry data to the cloud data storage system.

Clause 9. The smart humidifier of any preceding clause wherein the atomizer is idle when not operating and is ready following a period of time following a last operation of the atomizer.

Clause 10. The smart humidifier of any preceding clause, wherein the wake up event includes a sensed humidity being outside the preferred humidity range, a sensed temperature being outside a preferred temperature range, a pressing of a menu button on the user interface, or expiration of a timer.

Clause 11. The smart humidifier of any preceding clause, wherein if the microcontroller determines the atomizer is not idle or ready, the microcontroller determines if a humidifying event is complete before determining if the sensed humidity is within the preferred humidity range.

Clause 12. A smart humidifier, comprising: a housing; a refillable tank configured to be filled with a liquid and disposed in the housing; a wick disposed in a chamber in the tank and in fluid communication with liquid in the tank; an atomizer disposed in the housing between an aperture and an end of the wick, the atomizer being actuatable to vibrate against the end of the wick to convert the liquid in the wick to a mist; a sensor operable to sense a relative humidity of a space adjacent the housing; a battery; and a microcontroller unit electrically connected to the atomizer, the battery the sensor, the microcontroller configured to operate the atomizer based on the sensed relative humidity to adjust the relative humidity, the microcontroller configured to: operate in a standby state with the atomizer in an unpowered state when the sensed humidity is within a preferred humidity range, collect telemetry data comprising humidity, temperature and tank water level data following a wake up event, determine whether the atomizer is idle and ready for operation, determine whether the sensed humidity is within a preferred range following a determination that the atomizer is idle and ready, operate in a humidifying state with the atomizer actuated for a period of time when the sensed humidity is outside the preferred humidity range to increase a humidity in the space, and return to the standby state.

Clause 13. The smart humidifier of clause 12, wherein the microcontroller is configured to wirelessly communicate with a remote electronic device or server.

Clause 14. The smart humidifier of any of clauses 12-13, further comprising a sensor operable to sense a temperature in the space.

Clause 15. The smart humidifier of any of clauses 12-14, further comprising a sensor operable to sense a liquid level in the refillable tank.

Clause 16. The smart humidifier of any of clauses 12-15, further comprising a buzzer or speaker electrically connected to the microcontroller unit and being operable to provide an audio alert when the sensed humidity is outside the preferred humidity range.

Clause 17. A smart humidifier, comprising: a housing; a refillable tank configured to be filled with a liquid and disposed in the housing; a wick disposed in a chamber in the tank and in fluid communication with liquid in the tank; an atomizer disposed in the housing between an aperture and an end of the wick, the atomizer being actuatable to vibrate against the end of the wick to convert the liquid in the wick to a mist; a sensor operable to sense a relative humidity of a space adjacent the housing; a battery; and a microcontroller unit electrically connected to the atomizer, the battery the sensor, the microcontroller configured to operate the atomizer based on the sensed relative humidity to adjust the relative humidity, the microcontroller configured to: operate in a standby state with the atomizer in an unpowered state when the sensed humidity is within a preferred humidity range, determine whether the atomizer is idle and ready for operation, determine whether a sensed humidity is within a preferred range following a determination that the atomizer is idle and ready, operate in a humidifying state with the atomizer actuated for a period of time when the sensed humidity is outside the preferred humidity range to increase a humidity in the space, and return to the standby state.

Clause 18. The smart humidifier of clause 17, wherein the microcontroller is configured to wirelessly communicate with a remote electronic device or server.

Clause 19. The smart humidifier of any of clauses 17-18, further comprising a sensor operable to sense a liquid level in the refillable tank.

Clause 20. The smart humidifier of any of clauses 17-19, further comprising a buzzer or speaker electrically connected to the microcontroller unit and being operable to provide an audio alert when the sensed humidity is outside the preferred humidity range.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of the stated amount. As another example, in certain embodiments, the terms "generally parallel" and "substantially parallel" refer to a value, amount, or characteristic that departs from exactly parallel by less than or equal to 15 degrees.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Of course, the foregoing description is that of certain features, aspects and advantages of the present invention, to which various changes and modifications can be made without departing from the spirit and scope of the present invention. Moreover, the devices described herein need not feature all of the objects, advantages, features and aspects discussed above. Thus, for example, those of skill in the art will recognize that the invention can be embodied or carried out in a manner that achieves or optimizes one advantage or a group of advantages as taught herein without necessarily achieving other objects or advantages as may be taught or suggested herein. In addition, while a number of variations of the invention have been shown and described in detail, other modifications and methods of use, which are within the scope of this invention, will be readily apparent to those of skill in the art based upon this disclosure. It is contemplated that various combinations or subcombinations of these specific features and aspects of embodiments may be made and still fall within the scope of the invention. Accordingly, it should be understood that various features and aspects of the disclosed embodiments can be combined with or substituted for one another in order to form varying modes of the discussed devices.

What is claimed is:

1. A smart portable humidor humidifier, comprising:

a housing;

a refillable tank configured to be filled with a liquid via an opening and disposed in the housing;

a wick disposed in a chamber in the tank and in fluid communication with liquid in the tank;

an atomizer disposed in the housing between an aperture and an end of the wick, the atomizer being actuatable to vibrate against the end of the wick to convert the liquid in the wick to a mist;

a sensor operable to sense a relative humidity of a space adjacent the housing;

a battery;

an electronic display;

a user interface electrically connected to the electronic display; and a microcontroller unit electrically connected to the atomizer, the battery the sensor, the electronic display and the user interface, the microcontroller configured to operate the atomizer based on the sensed relative humidity to adjust the relative humidity, the microcontroller configured to:

operate in a standby state with the atomizer in an unpowered state when the sensed humidity is within a preferred humidity range, collect telemetry data comprising humidity, temperature and tank water level data following a wake up event, determine whether the atomizer is idle and ready for operation, determine whether the sensed humidity is within a preferred range following a determination that the atomizer is idle and ready, operate in a humidifying state with the atomizer actuated for a period of time when the sensed humidity is outside the preferred humidity range to increase a humidity in the space, and return to the standby state.

2. The smart humidifier of claim 1, wherein the microcontroller is configured to wirelessly communicate with a remote electronic device or server.

3. The smart humidifier of claim 1, further comprising a sensor operable to sense a temperature in the space.

4. The smart humidifier of claim 1, further comprising a sensor operable to sense a liquid level in the refillable tank.

5. The smart humidifier of claim 1, wherein the electronic display is an electrophoretic display.

6. The smart humidifier of claim 1, further comprising a buzzer or speaker electrically connected to the microcontroller unit and being operable to provide an audio alert when the sensed humidity is outside the preferred humidity range.

7. The smart humidifier of claim 1, wherein the atomizer and opening are on a same side of the tank.

8. The smart humidifier of claim 1, wherein following the humidifying state, the microcontroller is configured to enable wireless communication, determine whether to update a cloud based data storage, and to optionally send the telemetry data to the cloud based data storage.

9. The smart humidifier of claim 1 wherein the atomizer is idle when not operating and is ready following a period of time following a last operation of the atomizer.

10. The smart humidifier of claim 1, wherein the wake up event includes a sensed humidity being outside the preferred humidity range, a sensed temperature being outside a preferred temperature range, a pressing of a menu button on the user interface, or expiration of a timer.

11. The smart humidifier of claim 1, wherein if the microcontroller determines the atomizer is not idle or ready, the microcontroller determines if a humidifying event is complete before determining if the sensed humidity is within the preferred humidity range.

12. A smart portable humidor humidifier, comprising:

a housing;

a refillable tank configured to be filled with a liquid and disposed in the housing;

a wick disposed in a chamber in the tank and in fluid communication with liquid in the tank;

an atomizer disposed in the housing between an aperture and an end of the wick, the atomizer being actuatable to vibrate against the end of the wick to convert the liquid in the wick to a mist;

a sensor operable to sense a relative humidity of a space adjacent the housing;

a battery; and a microcontroller unit electrically connected to the atomizer, the battery the sensor, the microcontroller configured to operate the atomizer based on the sensed relative humidity to adjust the relative humidity, the microcontroller configured to:

operate in a standby state with the atomizer in an unpowered state when the sensed humidity is within a preferred humidity range, collect telemetry data comprising humidity, temperature and tank water level data following a wake up event, determine whether the atomizer is idle and ready for operation, determine whether the sensed humidity is within a preferred range following a determination that the atomizer is idle and ready, operate in a humidifying state with the atomizer actuated for a period of time when the sensed humidity is outside the preferred humidity range to increase a humidity in the space, and return to the standby state.

13. The smart humidifier of claim 12, wherein the microcontroller is configured to wirelessly communicate with a remote electronic device or server.

14. The smart humidifier of claim 12, further comprising a sensor operable to sense a temperature in the space.

15. The smart humidifier of claim 12, further comprising a sensor operable to sense a liquid level in the refillable tank.

16. The smart humidifier of claim 12, further comprising a buzzer or speaker electrically connected to the microcontroller unit and being operable to provide an audio alert when the sensed humidity is outside the preferred humidity range.

17. A smart portable humidor humidifier, comprising:

a housing;

a refillable tank configured to be filled with a liquid and disposed in the housing;

a wick disposed in a chamber in the tank and in fluid communication with liquid in the tank;

an atomizer disposed in the housing between an aperture and an end of the wick, the atomizer being actuatable to vibrate against the end of the wick to convert the liquid in the wick to a mist;

a sensor operable to sense a relative humidity of a space adjacent the housing;

a battery; and a microcontroller unit electrically connected to the atomizer, the battery the sensor, the microcontroller configured to operate the atomizer based on the sensed relative humidity to adjust the relative humidity, the microcontroller configured to:

operate in a standby state with the atomizer in an unpowered state when the sensed humidity is within a preferred humidity range, determine whether the atomizer is idle and ready for operation, determine whether a sensed humidity is within a preferred range following a determination that the atomizer is idle and ready, operate in a humidifying state with the atomizer actuated for a period of time when the sensed humidity is outside the preferred humidity range to increase a humidity in the space, and return to the standby state.

18. The smart humidifier of claim 17, wherein the microcontroller is configured to wirelessly communicate with a remote electronic device or server.

19. The smart humidifier of claim 17, further comprising a sensor operable to sense a liquid level in the refillable tank.

20. The smart humidifier of claim 17, further comprising a buzzer or speaker electrically connected to the microcontroller unit and being operable to provide an audio alert when the sensed humidity is outside the preferred humidity range.

* * * * *